(12) United States Patent
Green et al.

(10) Patent No.: US 9,213,474 B2
(45) Date of Patent: Dec. 15, 2015

(54) SYSTEM AND METHOD FOR DISPLAYING WELL DATA (71) Applicants: David W. Green, Richmond, TX (US); William T. Block, Friendswood, TX (US)

(72) Inventors: David W. Green, Richmond, TX (US); William T. Block, Friendswood, TX (US)

(73) Assignee: Baker Hughes Incorporated, Houston, TX (US)

( * ) Notice: Subject to any disclaimer, the term of this patent is extended or adjusted under 35 U.S.C. 154(b) by 245 days.

(21) Appl. No.: 13/924,095

(22) Filed: Jun. 21, 2013

(65) Prior Publication Data
US 2014/0380217 A1 Dec. 25, 2014

(51) Int. Cl.
G06F 3/048 (2013.01)
G01V 1/00 (2006.01)
G06F 3/0484 (2013.01)

(52) U.S. Cl.
CPC .................................. G06F 3/04842 (2013.01)

(58) Field of Classification Search
None
See application file for complete search history.

(56) References Cited

U.S. PATENT DOCUMENTS

| | | | |
|---|---|---|---|
| 4,276,599 A | 6/1981 | Maricelli et al. | |
| 4,297,879 A | 11/1981 | Howells et al. | |
| 4,586,137 A | 4/1986 | Frost, Jr. et al. | |
| 4,633,446 A | 12/1986 | Kesner | |
| 4,825,073 A | 4/1989 | Smith, Jr. et al. | |
| 5,684,940 A | 11/1997 | Freeman et al. | |
| 5,689,717 A | 11/1997 | Pritt | |
| 6,526,373 B1 * | 2/2003 | Barral | 703/6 |
| 7,414,637 B2 | 8/2008 | Fogel et al. | |
| 7,757,179 B2 | 7/2010 | Theophil et al. | |
| 8,321,130 B2 | 11/2012 | Hill et al. | |
| 2001/0033292 A1 | 10/2001 | Scott et al. | |
| 2005/0197139 A1 * | 9/2005 | Misikangas et al. | 455/456.1 |
| 2006/0010142 A1 * | 1/2006 | Kim et al. | 707/100 |
| 2006/0061595 A1 | 3/2006 | Goede et al. | |
| 2006/0082594 A1 | 4/2006 | Vafiadis et al. | |
| 2007/0061079 A1 | 3/2007 | Hu | |
| 2009/0276157 A1 | 11/2009 | Wilkinson et al. | |
| 2010/0010745 A1 | 1/2010 | Thorne | |
| 2011/0131232 A1 | 6/2011 | Hill et al. | |
| 2012/0269436 A1 | 10/2012 | Mensink et al. | |
| 2014/0310633 A1 * | 10/2014 | McLellan et al. | 715/771 |

OTHER PUBLICATIONS

Notification of Transmittal of the International Search Report and the Written Opinion of the International Searching Authority, or the Declaration; PCT/US2014/043374; Oct. 22, 2014, 12 pages.
Lin, Chun-Fu, "A Simulated Annealing Algorithm for RFID Reader Networks". IEEE, Wireless Communications and Networking Conference, Mar. 11-15, 2007. pp. 1671-1974.

* cited by examiner

*Primary Examiner* — Stephen Alvesteffer
(74) *Attorney, Agent, or Firm* — Cantor Colburn LLP (57) ABSTRACT

A method of delivering data from an energy industry or formation operation includes: receiving a data set representing parameter values generated during at least a portion of the operation; generating at least one data structure on a display area, the at least one data structure providing a visual representation of at least a portion of the data set; selecting a visual indicator associated with each of the at least one data structure, the visual indicator including information identifying an associated data structure; iteratively determining a suitable location for placement of the visual indicator on the display area by a processor using a probabilistic algorithm; and generating the display including the visual indicator located at the suitable position.

18 Claims, 4 Drawing Sheets

SYSTEM AND METHOD FOR DISPLAYING WELL DATA

BACKGROUND

Large amounts of data and information are typically acquired during energy industry operations, such as exploration, formation evaluation, production and drilling operations. Data output may take various forms, such as well logs produced from various logging operation. Labeling the curves on such logs by field engineers can be a time consuming effort. This is compounded by the need to typically perform such labeling multiple times a day on multiple logs and at numerous depth levels, as well as the need to position such labels so as not to obscure important data in a manner acceptable to customers.

SUMMARY

A method of delivering data from an energy industry or formation operation includes: receiving a data set representing parameter values generated during at least a portion of the operation; generating at least one data structure on a display area, the at least one data structure providing a visual representation of at least a portion of the data set; selecting a visual indicator associated with each of the at least one data structure, the visual indicator including information identifying an associated data structure; iteratively determining a suitable location for placement of the visual indicator on the display area by a processor using a probabilistic algorithm; and generating the display including the visual indicator located at the suitable position.

A system for delivering data from an energy industry or formation operation includes at least one data acquisition tool configured to measure at least one parameter of an earth formation, and a processor. The processor is configured to perform: receiving a data set representing parameter values generated during at least a portion of the operation; generating at least one data structure on a display area, the at least one data structure providing a visual representation of at least a portion of the data set; selecting a visual indicator associated with each of the at least one data structure, the visual indicator including information identifying an associated data structure; iteratively determining a suitable location for placement of the visual indicator on the display area using a probabilistic algorithm; and generating the display including the visual indicator located at the suitable position.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
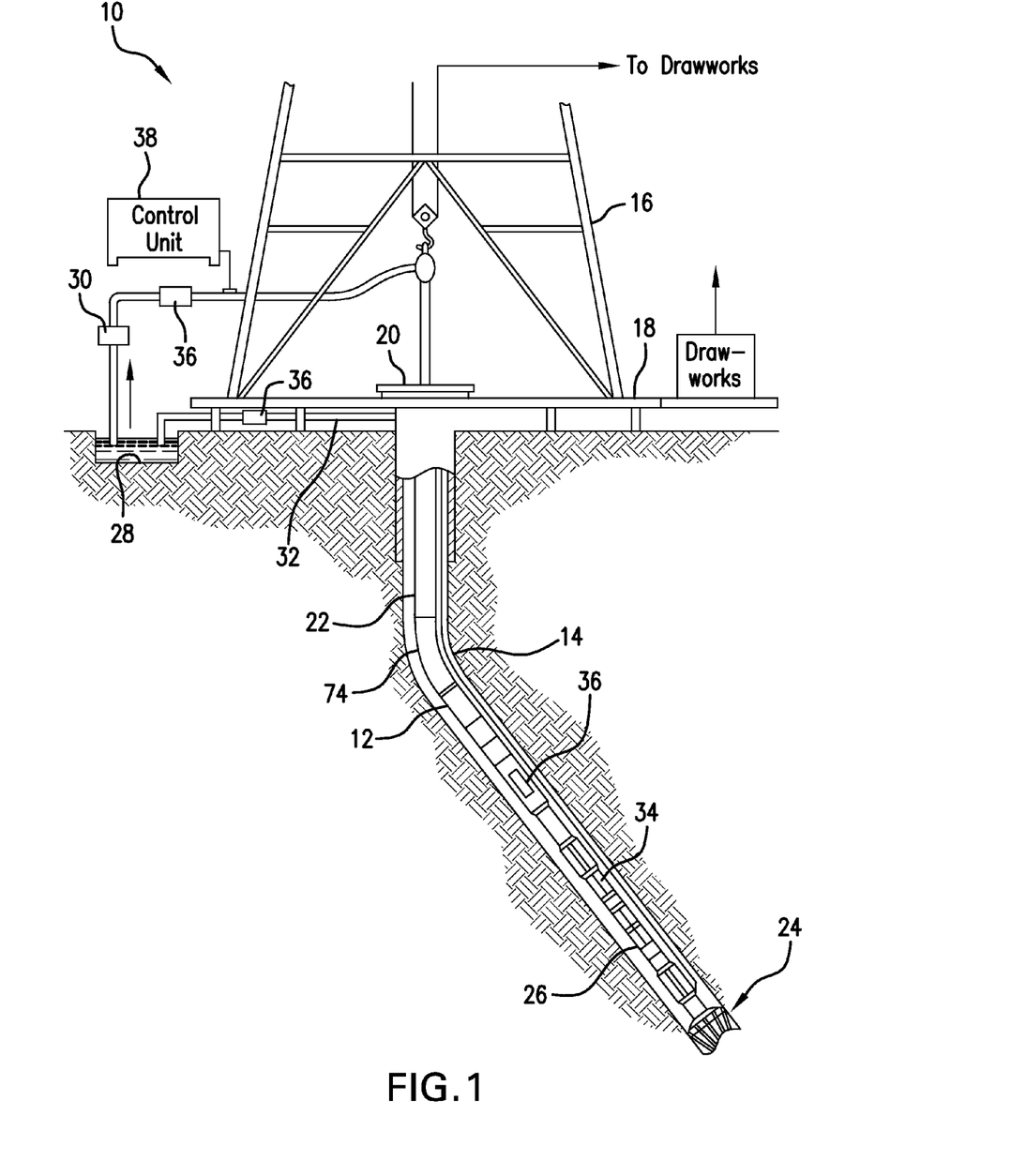
FIG. 1 is a side cross-sectional view of an embodiment of a subterranean well drilling, evaluation, exploration and/or production system.

Referring to FIG. 1, an exemplary embodiment of a well drilling, measurement, evaluation and/or production system 10 includes a borehole string 12 that is shown disposed in a borehole 14 that penetrates at least one earth formation during a downhole operation, such as a drilling, measurement and/or hydrocarbon production operation. In the embodiment shown in FIG. 1, the borehole string is configured as a drill string. However, the system 10 and borehole string 12 are not limited to the embodiments described herein, and may include any structure suitable for being lowered into a wellbore or for connecting a drill or downhole tool to the surface. For example, the borehole string 12 may be configured as wired pipe, coiled tubing, a wireline or a hydrocarbon production string.

In one embodiment, the system 10 includes a derrick 16 mounted on a derrick floor 18 that supports a rotary table 20 that is rotated by a prime mover at a desired rotational speed. The drill string 12 includes one or more drill pipe sections 22 or coiled tubing, and is connected to a drill bit 24 that may be rotated via the drill string 12 or using a downhole mud motor. The system 10 may also include a bottomhole assembly (BHA) 26. Other components of the system 10 include, e.g., a mud pit 28 and one or more mud pumps 30 connected to an injection line and a return line 32.

Various data acquisition tools such as sensor devices and/or downhole tools may be disposed at the surface and/or in the borehole 12 to measure parameters of components of the system 10 and/or downhole parameters. For example, a downhole tool 34 is incorporated into any location along the drill string 12 and includes sensors for measuring downhole fluid parameters (e.g., pressure, fluid flow, fluid composition), borehole string parameters, operational parameters and/or formation parameters. Additional sensors 36 may be located at selected locations, such as an injection fluid line and/or the return line 32. Downhole tools and sensors may include a single tool or multiple tools disposed downhole, and sensors may include multiple sensors such as distributed sensors or sensors arrayed along a borehole string.

The sensors and downhole tool configurations are not limited to those described herein. The sensors and/or downhole tool 34 may be configured to provide data regarding measurements, communicate with surface or downhole processors, and/or perform control functions. Such sensors can be deployed before, during or after drilling, e.g., via wireline, measurement-while-drilling ("MWD") or logging-while-drilling ("LWD") components. LWD and other measurement data may be transmitted to the surface or saved in memory downhole. Exemplary formation parameters that could be measured or monitored include resistivity, density, porosity, permeability, acoustic properties, nuclear-magnetic resonance properties, formation pressures, properties or characteristics of the fluids downhole and other desired properties of the formation surrounding the borehole 14. The system 10 may further include a variety of other sensors and devices for determining one or more properties of the BHA (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

Various types of data may be collected via acquisition tools and delivered and/or displayed for analysis of a formation. Data acquired by embodiments described herein may be generally referred to as formation data or well data, but is not limited to the specific data types described herein. Such data may be acquired via downhole or surface devices associated with a borehole or well and/or acquired via surface devices (e.g., seismic surveying systems).

Acquired data may include data sets or portions thereof that can be provided as a deliverable from well and/or formation operations. One type of deliverable is a well log. A "log," in one embodiment, is a continuous plot of data acquired from a well during and/or after a formation operation. As described herein, a "formation operation" refers to any surface or downhole operation (e.g., drilling, exploration, formation evaluation) related to hydrocarbon exploration and/or production.

In one embodiment, the downhole tool 34, the BHA 26 and/or the sensors 36 are in communication with a surface processing unit 38. The surface processing unit 38 may be configured to receive and process acquired data, deliver data (e.g., generate visual well log or other display), and/or control various production and/or drilling parameters. Any of various transmission media and connections, such as wired connections, fiber optic connections, wireless connections and mud pulse telemetry may be utilized to facilitate communication between system components.

The downhole tool 34, BHA 26 and/or the surface processing unit 38 may include components as necessary to provide for storing and/or processing data collected from various sensors therein. Exemplary components include, without limitation, at least one processor, storage, memory, input devices, output devices and the like.

Figure 2:
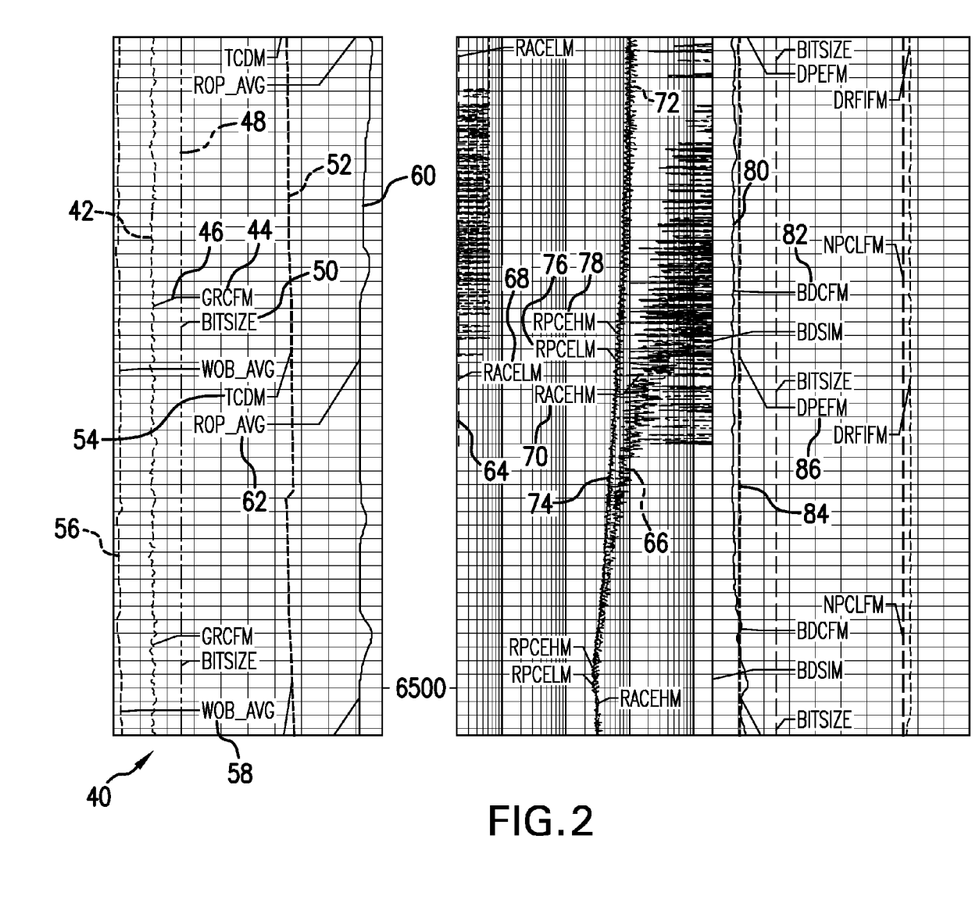
FIG. 2 depicts a portion of an exemplary well log data display.
Figure 3:
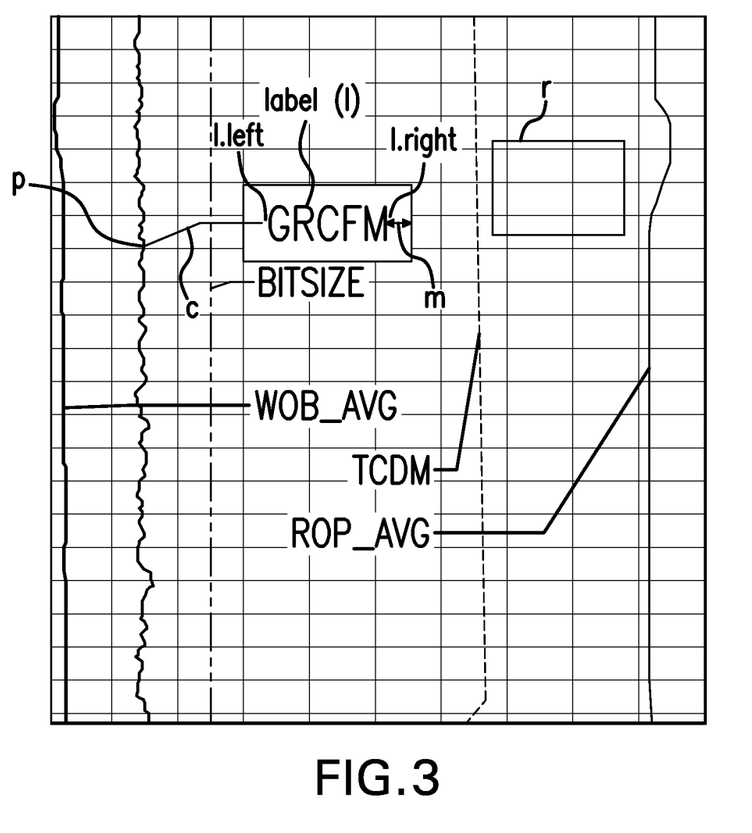
FIG. 3 depicts a close-up portion of the well log data display of FIG. 2.

FIGS. 2 and 3 depict portions of an exemplary well log that includes acquired data representing parameter values, which are displayed as curves or plots. The well log also includes various visual indicators or labels providing information regarding each curve or set of data. In this example, each curve is associated with a label that indicates the type of data collected, i.e., the borehole or formation parameter information collected by measurements. It is noted that the well log described herein is non-limiting, as data can be displayed and/or delivered in any suitable format (e.g., graphs, tables, printouts, etc.)

FIG. 2 shows a well log 40 that displays a continuous stream of data collected during a LWD operation. FIG. 3 is a close-up of part of the log 40 shown in FIG. 2. The well log 40 includes a plurality of curves representing data derived from various measurements. The well log 40 includes three tracks displaying various information in the form of curves, and each of the curves is associated with a label and a pointer connecting the label to the respective curve. The curves progress along a vertical axis corresponding to, e.g., depth or time.

In the left-hand track, a curve 42 displays borehole gamma ray data and is identified by a label 44, shown as "GRCFM". The label 44 is connected to the curve 42 by a pointer 46. A curve 48 indicates the size of the drill bit and is connected to a label 50, shown as "BITSIZE". A temperature curve 52 is identified by a "TCDM" label 54. An average weight-on-bit curve 56 is connected to a "WOB_AVG" label 58, and an average rate of penetration curve 60 is connected to a "ROP_AVG" label 62.

In the center track, resistivity data is displayed. Curves 64 and 66 show resistivity amplitude data and are associated with "RACELM" labels 68 and "RACEHM" labels 70, respectively. Curves 72 and 74 show resistivity phase differences and are associated with "RPCELM" labels 76 and "RPCEHM" labels 78, respectively. In the right-hand track, density data is displayed. Curves in this track include a bulk density curve 80 associated with a "BDCFM" label 82 and a density porosity curve 84 associated with a "DPEFM" label 86.

Although the curves are associated with labels via pointers, such pointers are not required, as any technique for associating curves with labels may be used. For example, labels can be color-coordinated with curves or data or otherwise provide a visual association (e.g., bold font, line and label thicknesses). In addition, various other visual structures, such as alphanumeric structures or illustrations, can be included on the log or other deliverable. Such structures can be used to provide additional information, such as well numbers, formation identifiers, lithology information, etc.

Figure 4:
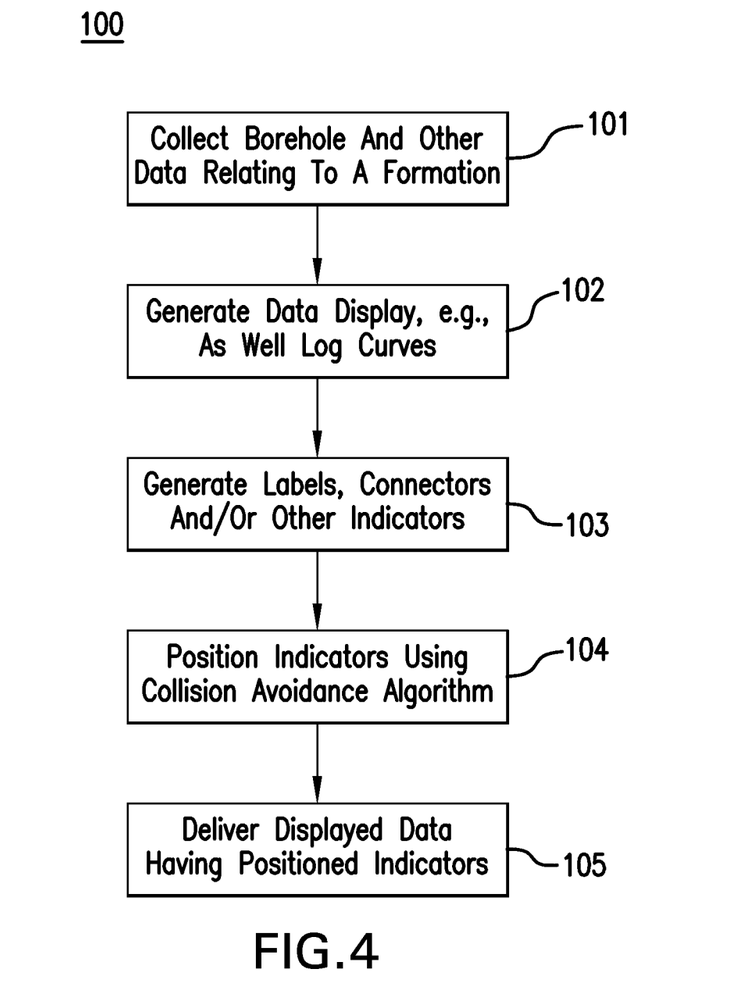
FIG. 4 is a flow chart illustrating a method of displaying well log data and data labels.

FIG. 4 illustrates a method 100 of displaying and/or delivering well data or other acquired data. The method 100 includes configuring and/or positioning information labels or other visual indications that provide information regarding data sets in the display and/or deliverable. The method 100, in one embodiment, is used in conjunction with the system 10 and/or the surface processing unit 38, although the method 100 may be utilized in conjunction with any suitable combination of sensing devices, acquisition tools and processors. The method 100 includes one or more stages 101-105. In one embodiment, the method 100 includes the execution of all of stages 101-105 in the order described. However, certain stages may be omitted, stages may be added, or the order of the stages changed.

In the first stage 101, data is acquired from a formation operation. Acquisition may include collecting data and/or processing received data to calculate parameter information. For example, a drill string, logging string and/or production string 12 is disposed within the wellbore 14 and a downhole operation is performed. During the operation, data is collected via sensor devices (e.g., the sensors 36 and/or the downhole tool 34). Such data provides information related to, for example, drilling and/or borehole string parameters, rock parameters, lithology, density, porosity, permeability, fluid composition and others. Any types of data acquisition and/or sensor devices may be used, such as sampling devices, temperature and pressure sensors, gamma ray sensors, pulsed neutron sensors, acoustic sensors, magnetic resonance sensors and resistivity sensors. Data sets that can be utilized with the method 100 include any structured and/or unstructured data and information related to an earth formation, acquired during all or a portion of a drilling or other formation operation.

In the second stage 102, the data is processed for display in a suitable visual format by a processor. Data sets or portions thereof are used to generate data structures representing various parameters. Exemplary data structures include plots, graphs, charts and curves.

In one embodiment, the data is processed and delivered as a visual record of measurements referred to as a log or well log. Exemplary well logs display data sets as a number of curves showing the progression of various types of measured data representing various parameters. Such data can be displayed as a function of depth or time.

An exemplary log is shown in FIG. 2, which includes curves representing data sets related to parameters including drilling, gamma ray, resistivity and density data as discussed above. Well logs can be displayed on a screen and manipulated by a user (e.g., changing scale, scrolling) and/or printed.

In the third stage 103, various visual indicators or identifiers are generated and/or selected to be assigned to different curves or other visual structures in the display area. In one embodiment, identifiers include labels that provide identifying information for a curve or other set of data. The identifiers may include additional structures such as lines, arrows or pointers that associate a label with a particular data set or curve. Other characteristics may be assigned to the identifiers, such as colors or other visual indications that allow a user to associate a data set or curve with an identifier.

In one embodiment, the visual indicators are curve labels assigned to each curve in a well log, such as the log 40. Each curve in this example has a label attached with a pointer of the same color as the curve.

In the fourth stage 104, labels or other visual indicators are positioned relative to each curve or other data structure, using a collision avoidance algorithm. The algorithm positions the indicators according to selected rules or conditions. Such conditions are provided to ensure that the indicators and their associations can be readily understood. The algorithm places the indicators so that they do not contact or overlap other structures in the display, such that an indicator does not contact an associated data structure or curve, other data structures or identifiers and other structures that would make reading and interpreting the identifiers difficult. In addition to positioning the indicators, the algorithm also positions any additional structures to be added to the display area, such as the pointers.

For a well log such as the log 40, for example, various conditions are selected for placing the labels. Such conditions may include one or more of:

labels cannot overlap each other;
labels have to stay within the curve's track;
labels have to avoid crossing heavy and medium weight horizontal grid lines;
labels have to avoid being drawn over curves; and
label pointers cannot cross each other.

In one embodiment, the collision avoidance algorithm is a probabilistic algorithm that iteratively determines a suitable location for each indicator and other visual structure in the display area. An exemplary algorithm is a simulated annealing algorithm. A simulated annealing algorithm uses equations analogous to those that control the thermodynamic process of annealing metal.

A simulated annealing algorithm can be used to solve NP-Hard problems, or computational problems that require more than polynomial time to reach a solution. Optimizing the placement of each identifier for a display (e.g., using an optimization or iterative exhaustive method) can result in a large number of iterations that would unacceptably delay generating a display or deliverable. For example, for laying out a number of labels "l" given a number of points or possible positions "n" to place the label, the required number of iterations in an exhaustive search can be represented by the exponential function $O(l^n)$. Thus, for a display region having 5 labels about 10 points, the number of iterations required to test each possible placement would be $5^{10}=9,765,625$, and this number would increase as the layout space and number of labels increase, making the solution set difficult to evaluate practically. Using quality controlled temperature and energy functions, simulated annealing can find a suitable or "good enough" solution in a relatively small number of iterations.

An embodiment of the annealing algorithm as applied to determining an acceptable or suitable position for a label or other identifier is described in the context of the following equations. The algorithm positions labels and other structures (e.g., connectors) in a display area by probabilistically considering neighboring configurations relative to current configurations. A configuration in this embodiment refers to the positions of one or more labels or other visual structures in a display area relative to the data structures (e.g., curves). This consideration is performed successively for a plurality of configurations until a suitable configuration is found.

An embodiment of an annealing algorithm specifies the probability of moving a label location or configuration to a neighboring location or configuration by an acceptance probability function (P) that is a function of the total cost or "energy" of a system having a label or labels positioned at a particular location or in a particular configuration within the display area. The function P is a function of the energy or total cost (E) of a current location/configuration and the energy or total cost (E') of a neighboring location/configuration, and is also a function of a global time-varying parameter (T).

The probability P that the label or labels move from a current to a neighboring position depends on whether E' is less than E, and also on how much lower E' is than E. The parameter T is initially set to a relatively high value, increasing the probability of a move even if E' is greater than E, and is reduced at each successive iteration until T=0 or until a maximum number of iterations has been performed. The parameter T can be reduced according to a selected annealing schedule.

In one embodiment, the algorithm iteratively calculates the total cost and compares the total cost for successively selected positions. At each iteration, the total cost of the current position is compared to the total cost of some neighboring position. If the neighboring position represents a smaller total cost, the current position may be moved to the neighboring position. For each iteration, a delta can be calculated for moving a label from the current ("as-is") position to the neighboring ("to-be") position to determine via the probability function whether the neighboring position should be selected.

As described herein, a "position" or configuration may refer to the position of an individual label and/or connector, or may refer to the overall configuration of a plurality of visual structures. For example, referring to FIG. 2, a position or configuration refers to the position in the display area of labels 44, 48, 52 and 56, and their associated connectors. The configuration may also include the position of any additional visual structures and/or the position and area of any portion that can be selected by a user or is otherwise of increased importance.

In one embodiment, one or more of the following equations are used to calculate the total cost. In one example, all of the equations are used, although any combination may be used. An example of some of the variables referenced in the following equations is shown in FIG. 3.

Each equation assigns a cost of a position or configuration based on a different condition. The costs shown herein are exemplary and can be adjusted based on, e.g., the relative importance of each condition. Exemplary conditions for which a cost may be calculated include anchor point overlap, obscured background, obscured curve, connector length, label overlap, crossing between connectors and crossing between connectors and labels. A cost multiplier may be applied to one or more conditions to increase the relative cost of a condition. Exemplary cost multipliers "$\lambda$" are shown below.

The equations below use a two-dimensional orthogonal coordinate system having a horizontal axis "x" and a vertical axis "y." The equations could be applied to other coordinates where appropriate.

An "anchor point overlap" condition occurs when an attachment point on a curve overlaps the vertical and/or horizontal extent of an associated label. The attachment point is the point on the curve at which the connector contacts the curve. The anchor point overlap cost may be calculated based on the following equation:

$$\Sigma_{i=0}^{n} \max(0, \min(p_i.x-(l_i.\text{left}-m),(l_i.\text{right}+m)-p_i.x))^{2}*\lambda \quad (1)$$

In this equation, "l" is the label, "m" is a fixed size margin surrounding the label, "p" is the attachment point, and "n" is the number of labels. As shown in the equation, an individual cost is calculated for each individual label and associated attachment point (li and pi) based on the attachment point position, the label boundaries (li.left and li.right) and the margin. The individual costs are summed to calculate the cost for the current placement (i.e., configuration or position) of labels and pointers. An anchor overlap cost multiplier (e.g., $\lambda=1000$) may be applied. The attachment point, label positions and boundaries are calculated in the horizontal (x) direction; however the overlap cost may be calculated in the horizontal direction, the vertical direction, or both.

An "obscured background" condition may occur when one or more labels overlap or otherwise obscure some background structure or other visual structure displaying information. A cost for this condition may be calculated by summing the area of all portions of each label that overlap a background structure. The background structure may be defined by a portion of the display area. In this example, the portion is a rectangle, but could be any suitable shape. In addition, the defined portion can be used to select any area of the display that is of increased importance, and can be selected by a user (e.g., customer). For example, a portion of the display area can be defined for areas of high value information to ensure that labels and other structures avoid such high value information present on the log.

An exemplary equation for calculating the obscured background cost is:

$$\Sigma_{i=0}^{n}[[\Sigma_{j=0}^{k}\text{Area}(l_i \cap r_j)]*\lambda] \quad (2)$$

where "r" is a background rectangle and "k" is the number of background rectangles. The cost multiplier in this example is $\lambda=100000$. An example of a background rectangle is shown in FIG. 3.

An "obscured curve" condition occurs when one or more labels overlap or obscure a curve. An exemplary calculation includes defining the curves by very short line segments, and defining a rectangular or other area based on the start and end point of each segment that is tested against each label's extent. This cost is calculated similarly to the obscured background cost, but in this case the rectangles r are defined by the line segments:

$$\Sigma_{i=0}^{n}[[\Sigma_{j=0}^{k}\text{Area}(l_i \cap r_j)]*\lambda]. \quad (3)$$

A "connector length" cost is associated with the length of each connector. The length is calculated as the distance from the center point of the label to the attachment point on the curve:

$$\Sigma_{i=0}^{n}[\text{length}(l_i \rightarrow p_i)*\lambda]. \quad (4)$$

The connector length cost multiplier is, e.g., $\lambda=1000$.

A "label overlap" condition occurs when labels overlap one another. An exemplary equation for calculating the label overlap cost is:

$$\Sigma_{i=0}^{n-1}[[\Sigma_{j=i}^{n}\text{Area}(l_i \cap l_j)]*\lambda]. \quad (5)$$

The label overlap cost multiplier is, e.g., $\lambda=1000$.

A "connector crossing" cost may be calculated to account for two or more connectors crossing. An exemplary equation for calculating this cost is:

$$\Sigma_{i=0}^{n-1} \text{ if } [c_i \cap c_{i+1}] \text{ then } \lambda, \quad (6)$$

where "c" is a connector, "n" is the number of connectors, and the connector length cost multiplier is, e.g., $\lambda=1000000$.

A "connector crossing label" cost may be calculated for conditions where a connector crosses through a label. An exemplary equation for calculating this cost is:

$$\Sigma_{i=0}^{n-1}[\Sigma_{j=i}^{n}\text{Area}(l_n \cap l_j)*\lambda], \quad (7)$$

where the background obscuring cost multiplier is, e.g., $\lambda=1000000$.

One or more of the above costs are used to calculate the total cost. For example, for each position or configuration, the total cost is calculated by summing each cost. This total cost can be used as an input into a suitable algorithm to determine a suitable position or configuration for a display area. In one embodiment, the total cost is used to calculate a probability function for a probabilistic algorithm such as the simulated annealing algorithm.

In the fourth stage 104, the resulting display for all or a portion of the data is delivered and may be used to analyze operational and/or formation data, predict future events, and/or understand the status of a current well or operation.

In one embodiment, generation and positioning of the labels or other identifiers are performed in a "just-in-time" manner, which can avoid or reduce delays in the generation of the deliverables. For example, the positioning algorithm is performed only for the portion of the display that is being currently delivered to a user. For example, the processor selects a portion of the well log or other data display based on the area being selected for display or delivery to a user. The display labels and other structures for the selected area are selected and positioned as described above for the selected area. In this way, labels can be placed as the deliverable is provided and the processor need not wait until the entire log or full data set(s) is ready for delivery before placing the labels. In one embodiment, the processor only performs the algorithm and labels the log (or a portion thereof) at the time it is needed, e.g., as a user scrolls to a page in the log that requires labeling, or when the log or a portion thereof is printed.

For example, the log 40 shown in FIG. 2 may be a portion of a well log that is currently displayed on a user's computer screen. In this example, the algorithm is performed for this portion in response to the user scrolling to or otherwise selecting the portion; the algorithm is not applied to subsequent portions until they are requested for display or delivery by the user.

Generally, some of the teachings herein are reduced to an algorithm that is stored on machine-readable media. The algorithm is implemented by a computer or processor such as the surface processing unit 38 and provides operators with desired output. For example, data may be transmitted in real time from the tool 34 or sensors 36 to the surface processing unit 38 for processing. As described herein, a processor may refer to one or more processors configured to perform all or part of the various methods described herein. For example, the methods described herein may be performed by a single processor processing unit (e.g., the surface processing unit 38) or by multiple processors (e.g., an a cloud computing or network). In addition, a "processor" may include one or more downhole or surface processors associated with a drilling or other oilfield operation, e.g., processors reducing the complexity of the data (such as by data compression) or acting as pre-processors.

The systems and methods described herein provide various advantages over prior art techniques. The systems and methods provide an efficient way to calculate label positions for data displays without adding significant delays to delivery of such displays. In addition, the methods provide for automated labeling that can be applied to data deliverables that can be very large (e.g., well log printouts can be very long). Labeling such deliverables can be very time-consuming. The systems and methods described herein address this deficiency in the prior art.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of delivering data from an energy industry or formation operation, comprising:
   receiving a data set representing parameter values generated during at least a portion of the operation;
   generating at least one data structure on a display area, the at least one data structure providing a visual representation of at least a portion of the data set;
   selecting a visual indicator associated with each of the at least one data structure, the visual indicator including information identifying an associated data structure;
   iteratively determining a suitable location for placement of the visual indicator on the display area by a processor using a probabilistic algorithm; and
   generating the display including the visual indicator located at the suitable position, wherein determining the suitable location includes, for each iteration, performing:
      calculating a probability value based on at least a first cost value, a second cost value, and a time-varying parameter, the first cost value based on a current position relative to the at least one data structure, the second cost value based on a different position relative to the at least one data structure; and
      moving the visual indicator from the current position to the different position in response to the probability value being at least a selected value.

2. The method of claim 1, wherein the data set is a well log and the at least one data structure is at least one curve representing measurement data collected from measurements of an earth formation.

3. The method of claim 1, wherein the probabilistic algorithm is a simulated annealing algorithm.

4. The method of claim 1, wherein
   the different position is a neighboring position for the visual indicator, the second cost value based on the neighboring position relative to the position of the at least one data structure.

5. The method of claim 1, wherein the time-varying parameter is reduced as the algorithm progresses through each iteration according to a selected schedule.

6. The method of claim 1, wherein the data set is a well log, each of the at least one data structure is a curve, the visual indicator is a label identifying an associated curve, and the first cost value and the second cost value are calculated based on at least one of:
   whether and to what extent the label obscures at least one of the associated curve and another curve;
   a length of a connector between the label and the associated curve;
   whether and to what extent the label obscures another label; and
   whether a connector crosses at least one of another connector and a label.

7. The method of claim 1, wherein the first cost value and the second cost value are calculated based on whether and to what extent the visual indicator obscures an area of the display area selected by a user.

8. The method of claim 1, wherein generating the display includes generating a portion of the display selected by a user.

9. The method of claim 8, wherein the determining the suitable location is performed in response to the portion being selected for delivery.

10. A system for delivering data from an energy industry or formation operation, comprising:
   at least one data acquisition tool configured to measure at least one parameter of an earth formation;
   a processor configured to perform:
   receiving a data set representing parameter values generated during at least a portion of the operation;
   generating at least one data structure on a display area, the at least one data structure providing a visual representation of at least a portion of the data set;
   selecting a visual indicator associated with each of the at least one data structure, the visual indicator including information identifying an associated data structure;
   iteratively determining a suitable location for placement of the visual indicator on the display area using a probabilistic algorithm; and
   generating the display including the visual indicator located at the suitable position, wherein determining the suitable location includes, for each iteration, performing:
      calculating a probability value based on at least a first cost value, a second cost value, and a time-varying parameter, the first cost value based on a current position relative to the at least one data structure, the second cost value based on a different position relative to the at least one data structure; and moving the visual indicator from the current position to the different position in response to the probability value being at least a selected value.

11. The system of claim 10, wherein the data set is a well log and the at least one data structure is at least one curve representing measurement data collected from measurements of an earth formation.

12. The system of claim 10, wherein the probabilistic algorithm is a simulated annealing algorithm.

13. The system of claim 10, wherein the different position is a neighboring position for the visual indicator, the second cost value based on the neighboring position relative to the position of the at least one data structure.

14. The system of claim 10, wherein the time-varying parameter is reduced as the algorithm progresses through each iteration according to a selected schedule.

15. The system of claim 10, wherein the data set is a well log, each of the at least one data structure is a curve, the visual indicator is a label identifying an associated curve, and the first cost value and the second cost value are calculated based on at least one of:

whether and to what extent the label obscures at least one of the associated curve and another curve;

a length of a connector between the label and the associated curve;

whether and to what extent the label obscures another label; and whether a connector crosses at least one of another connector and a label.

16. The system of claim 10, wherein the first cost value and the second cost value are calculated based on whether and to what extent the visual indicator obscures an area of the display area selected by a user.

17. The system of claim 10, wherein generating the display includes generating a portion of the display selected by a user.

18. The system of claim 17, wherein determining the suitable location is performed in response to the portion being selected for delivery.

* * * * *